United States Patent
Dorsey et al.

(10) Patent No.: US 9,758,752 B2
(45) Date of Patent: Sep. 12, 2017

(54) METHOD OF PRODUCING AN ALCOHOLIC BEVERAGE HAVING A FRUITY FLAVOR

(75) Inventors: Audrey Joyce Dorsey, Blenbeim (NZ); William James Marfell, Blenheim (NZ); Frank Benkwitz, Auckland (NZ); Michael Johannes Harsch, Reims (FR); Andrew Frost, Blenheim (NZ)

(73) Assignee: PERNOD RICARD, Paris (FR)

( * ) Notice: Subject to any disclaimer, the term of this patent is extended or adjusted under 35 U.S.C. 154(b) by 526 days.

(21) Appl. No.: 14/236,411

(22) PCT Filed: Jul. 31, 2012

(86) PCT No.: PCT/EP2012/064919
§ 371 (c)(1),
(2), (4) Date: Mar. 25, 2014

(87) PCT Pub. No.: WO2013/017581
PCT Pub. Date: Feb. 7, 2013

(65) Prior Publication Data
US 2014/0234481 A1 Aug. 21, 2014

(30) Foreign Application Priority Data
Aug. 1, 2011 (EP) ..................... 11176136

(51) Int. Cl.
C12G 1/02 (2006.01)
C12G 1/04 (2006.01)

(52) U.S. Cl.
CPC ........ *C12G 1/04* (2013.01); *C12G 1/02* (2013.01)

(58) Field of Classification Search
CPC .................................. C12G 1/02; C12G 1/00
USPC ..................... 426/319, 11, 15, 592
See application file for complete search history.

(56) References Cited

FOREIGN PATENT DOCUMENTS

| CA | 2221921 A1 | 5/1998 |
| JP | 61074565 A * | 4/1986 |
| WO | 2007095682 A1 | 8/2007 |
| WO | 2009011807 A1 | 1/2009 |

OTHER PUBLICATIONS

Antonio G. Cordente et al. "Isolation of sulfite reductase variants of a commerical wine yeast with significantly reduced hydrogen sulfide production", FEMS Yeast Research (Federation of European Microbiological Societies), May 1, 2009, vol. 9, No. 3, pp. 446-459, Wiley-Blackwell Publishing Ltd., GB NL.

Kate S. Howell et al. "Variation in 4-mercapto-4-methyl-pentan-2-one release by *Saccharomyces cerevisiae* commerical wine strains" FEMS Microbiology Letters (Federation of European Microbiological Societies), Nov. 11, 2004, vol. 240, No. 2, pp. 125-129, Elsevier B.V. Publishing, Amsterdam NL.

International Search Report issued Sep. 26, 2012 re: PCT/EP2012/064919; WO 2007/095682, Howell et al. "Vairation . . . ", Swiegers et al. "Modulation of volatile . . . ", Tominaga et al. "Stereoisomeric Distribution . . . " and Cordente et al. "Isolation of sulfite . . . ".

J H Swiegers et al. "Modulation of volatile sulfur compounds by wine yeast", Applied Microbiology and Biotechnology, Jan. 30, 2007, vol. 74, No. 5, pp. 954-960, Springer, Berlin DE.

Takatoshi Tominaga et al. Stereoisomeric Distribution of 3-Mercaptohexan-1-0l and 3-Mercaptohexyl Acetate in Dry and Sweet White Wines Made from *Vitis vinifera* (Var. Sauvignon Blanc and Semillon), Journal of Agricultural and Food Chemistry, Sep. 1, 2006, vol. 54, No. 19, pp. 7251-7255.

Written Opinion issued Sep. 26, 2012 re: PCT/EP2012/064919; WO 2007/095682, Howell et al. "Vairation . . . ", Swiegers et al. "Modulation of volatile . . . ", and Tominaga et al. "Stereoisomeric Distribution . . . ".

* cited by examiner

*Primary Examiner* — Vera Stulii
(74) *Attorney, Agent, or Firm* — Cantor Colburn LLP

(57) ABSTRACT

The invention concerns a method of producing an alcoholic beverage by fermentation having flavor and taste of passion fruit and grapefruit, characterized in that it comprises the following steps: providing a gas stream containing hydrogen sulfide, bubbling the gas stream containing hydrogen sulfide into a grape juice and/or grape juice derived fractions prior to yeast inoculation, and/or during fermentation. The alcoholic beverage obtainable by the method can be chosen from the group constituted by wines, beers and spirits. Most preferably, the alcoholic beverage is a Sauvignon Blanc wine.

8 Claims, 1 Drawing Sheet

METHOD OF PRODUCING AN ALCOHOLIC BEVERAGE HAVING A FRUITY FLAVOR

This application is a continuation of International Application No. PCT/EP2012/064919, filed on Jul. 31, 2012, which claims the priority to European Patent Application No. 11176136.7, filed on Aug. 1, 2011, entitled "Method of producing an alcoholic beverage having a fruity flavor".

The present invention relates to a method of producing an alcoholic beverage having a fruity flavor and taste in nuance ranging from grapefruit to passion fruit. In particular, the alcoholic beverage is a Sauvignon Blanc wine, especially from New Zealand.

The aroma of food and beverages is one of the most important factors in determining the quality and intrinsic value of a product. For example, small variations in the presence and concentration of volatile aroma compounds can have profound effects on the quality of an alcoholic beverage.

In the case of wine, some of the most potent aroma compounds are volatile thiols like 3-mercaptohexan-1-ol (3MH) and 3-mercaptohexyl acetate (3MHA). These volatile thiols are normally non-detectable in grape juice but are synthesized and released by the yeast from a range of precursors during alcoholic fermentation.

Given that small variations in the presence and concentration of volatile thiols can have a significant effect on the quality of products such as wine, there is a need for a method enabling the production of alcoholic beverages containing such aroma compounds. Thus the development of new technologies enabling the regulation of the amount of thiols, in particular 3MH and 3MHA, in wine would allow winemakers to have more control over the amounts of these distinctive flavor compounds in their product. Such a technology would therefore be of significant commercial value.

There are well-known methods of producing alcoholic beverages having a fruity flavor and taste in nuances ranging from grapefruit to passion fruit.

International application WO2007/095682 A1 describes a method of modulating the aroma of a wine product containing a non-volatile sulfur compound. The method includes exposing the product to an isolated enzyme having a carbon-sulfur lyase enzyme activity capable of converting the non-volatile sulfur compound to a volatile thiol compound, wherein the aroma of the product is therefore modulated.

International application WO2009/11807 A1 relates to yeast strains, yeast fermentation starter cultures and methods of fermentation that allow for increased levels of 3MH and 3 MHA in wine.

Canadian application CA 2,221,921 describes a method of producing an alcoholic aqueous beverage by conventional mashing of the malt, lautering, boiling, cooling, fermenting, and storing is characterized in that hemp plants (flowers and/or flower parts and/or products made thereof) may be added at any point in time during boiling, fermenting or storage. The beverage of the invention has a fruity flavor and taste in nuances ranging from grapefruit to mango and passion fruit.

It is an object of the present invention to provide a useful alternative for producing an alcoholic beverage having a fruity flavor, in particular being reminiscent of grapefruit and passion fruit, which is easily carried out and which provides a better control of the level of the aromas in the obtained alcoholic beverage than other known methods of producing alcoholic beverages.

The object of the present invention is a method of producing an alcoholic beverage by fermentation having flavor and taste of passion fruit and grapefruit, which is characterized in that it comprises the following steps:
providing a gas stream containing hydrogen sulfide ($H_2S$),
bubbling the gas stream containing hydrogen sulfide into a grape juice and/or grape juice derived fractions prior to inoculation with yeast, and/or during ferment.

The method according to the present invention is applicable to any grape variety, but is preferably applied to grapes of the Sauvignon Blanc variety.

According to the method of producing an alcoholic beverage of the present invention, the gas stream containing hydrogen sulfide is preferably bubbled into the grape juice prior to yeast inoculation and stopped midway through fermentation.

In a preferred embodiment of the invention, the gas stream containing hydrogen sulfide is bubbled into the grape juice two days before the addition of yeast and continues until half way through the fermentation. This enables sufficient time for the hydrogen sulfide to react with volatile thiol precursors present in the grape juice, and avoids potential hydrogen sulfide spoilage of the finished wine.

The method of producing an alcoholic beverage having flavor and taste of passion fruit and grapefruit is characterized in that the produced alcoholic beverage has higher levels of 3MH and 3MHA in comparison to an alcoholic beverage obtained without the bubbling of a gas stream containing hydrogen sulfide.

Preferably, the produced alcoholic beverage contains at least 1.5-fold higher levels of 3MH and 3MHA in comparison to an alcoholic beverage obtained without the bubbling of a gas stream containing hydrogen sulfide.

Preferably, the gas stream containing hydrogen sulfide is taken from an existing wine ferment producing hydrogen sulfide naturally. Carbon dioxide is the main gas produced during the alcoholic fermentation. Hydrogen sulfide gas, like all aroma compounds (e.g. esters, terpenes), is a natural and minor by-product of yeast metabolism during wine fermentation and is therefore contained in the carbon dioxide stream generated.

The inventors have surprisingly found, that due to the bubbling of a gas stream containing hydrogen sulfide into grape juice, the volatile thiol content of 3MH and 3MHA in the finished wine had been increased, in some cases tripled, in relation to the volatile thiol content of wine derived from the same grapes obtained by standard methods without bubbling.

Indeed, hydrogen sulfide reacts with thiol precursors, which are present in the grape juice prior to start of the fermentation. The adducts obtained by this reaction are subsequently transformed into 3MH and 3MHA by yeast during fermentation.

The hydrogen sulfide content in the gas stream may vary from 6 ppm to 13 ppm, but is preferably around 10 ppm.

A ferment emitting sufficient amounts of hydrogen sulfide is chosen and the tank is sealed with an outlet pipe.

Advantageously, the bubbling of the gas stream containing hydrogen sulfide is carried out with sintered gas spargers. The spargers are porous and produce fine bubbles, which have a high surface area to volume ratio. A pressure relief valve at the gas supply tank is required to prevent over pressurization.

The depth of the outlet of the gas supply through the sparger has to be determined by the head pressure of the liquid being less than the gas pressure, otherwise no gas is expelled.

The volume of gas and the flow rate are determined by the rate of fermentation and the volume of the supplying ferment. Bubbling of the gas stream is dependent on the equipment in the winery.

The use of a sparger has the advantage that the bubbles are smaller and therefore exhibit a higher surface area to volume ratio.

The alcoholic beverage is chosen from the group constituted by wines, beers and spirits. Most preferably, the alcoholic beverage is a Sauvignon Blanc wine.

Thanks to the bubbling of hydrogen sulfide, which can be precisely controlled, the method of producing an alcoholic beverage according to the present invention provides a better control of the levels of grapefruit and passion fruit aromas than other known methods of producing alcoholic beverages. It represents a very valuable tool for the wine industry. Being able to increase and control the content of 3MH and 3MHA in Sauvignon Blanc wine is an important tool, which enables the more accurate creation of specific wine styles. The level of these aromas could be lifted if desired for a specific style, and the natural vintage-to-vintage variation reduced, offering a greater flexibility needed for the creation of wines of consistent quality. This makes it easier for wineries to target different markets and hence increase their market share.

Furthermore, the method of producing an alcoholic beverage according to the present invention leads to more potential thiol precursors being harnessed than under normal fermentation conditions (i.e. without the bubbling of a gas stream containing hydrogen sulfide).

A further object of the present invention is an alcoholic beverage obtainable by the production method described above.

Another object of the present invention is the use of a gas stream containing hydrogen sulfide to increase the level of 3MH and 3MHA in an alcoholic beverage obtained by fermentation in comparison to an alcoholic beverage obtained without the bubbling of a gas stream containing hydrogen sulfide.

In an early experiment the gas stream containing hydrogen sulfide came from a 300 000 L tank fermenting 10% of the sugar content per day. At the stage of ferment when the hydrogen sulfide was captured it was producing about 1.5 million liters of carbon dioxide per day. The gas stream contained 10 mg/L of hydrogen sulfide so was therefore supplying 15 kg of hydrogen sulfide per day to the receiving ferment.

This gas stream was bubbled under the surface of a tank holding 130 000 L of grape juice.

Figure 1:
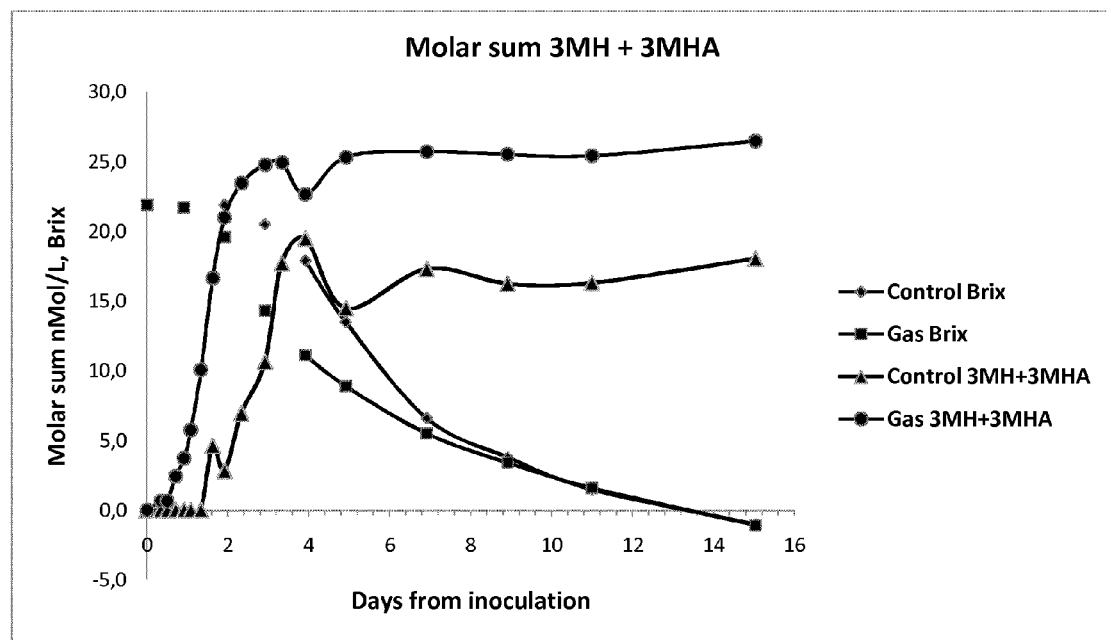
FIG. 1 is a graph showing the influence of the bubbling of hydrogen sulfide into grape juice on the synthesis of the volatile thiols 3MH and 3MHA during the production of Sauvignon Blanc wine.

The levels of the thiols 3MH and 3MHA were measured as a function of time starting from the inoculation of the grape juice with yeast. In FIG. 1, the x-axis represents the days from inoculation and the y-axis denotes the combined molar concentration of 3MH and 3MHA (nMol/L) as well as the sugar concentration measured in degrees Brix.

The curve entitled "Control 3MH+3MHA" represents the evolution of the combined concentration of 3MH and 3MHA in function of time starting from yeast inoculation, when the Sauvignon Blanc wine is produced in the absence of a bubbling of hydrogen sulfide.

The curve entitled "Gas 3MH+3MHA" represents the evolution of the combined concentration of 3MH and 3MHA in function of the time starting from yeast inoculation, when the Sauvignon Blanc wine is subjected to a bubbling of hydrogen sulfide, i.e. according to the method of the present invention. The gas was taken from a 300 000 L wine ferment that was fermenting fast and produced about 10 mg hydrogen sulfide per liter of carbon dioxide. The gas supplemented ferment had a volume of about 130 000 L.

The curve entitled "Control Brix" shows the progress of the fermentation, i.e. the reduction of the sugar content over time, when the production of wine is carried out in the absence of a bubbling of hydrogen sulfide.

The curve entitled "Gas Brix" shows the progress of the fermentation, i.e. the reduction of the sugar content over time, when the production of wine is carried out in the presence of a bubbling of hydrogen sulfide, i.e. according to the method of the present invention.

The graph of FIG. 1 shows that no thiols are present in the non-inoculated grape juice. Thiols are generated in the early phase of the fermentation and in this case leveled off, with a further smaller increase towards the end of fermentation.

In the experiment according to the invention, the gas containing hydrogen sulfide was turned off after two days into ferment, because the feed ferment stopped producing hydrogen sulfide.

In view of the graph of FIG. 1 it can be noticed that the production of thiols 3MH and 3MHA is higher when the production of wine is subjected to a bubbling of hydrogen sulfide, i.e. according to the present invention, than in the absence of hydrogen sulfide bubbling.

More precisely, 15 days after inoculation, the level of thiols 3MH and 3MHA of:
  the Sauvignon Blanc wine produced with bubbling of hydrogen sulfide (i.e. by the method according to the present invention) is 27 nMol/L;
  the Sauvignon Blanc wine produced without bubbling of hydrogen sulfide is 18 nMol/L (i.e. after following standard methods).

Thus, the combined level of thiols 3MH and 3MHA in the Sauvignon Blanc wine produced according to the method of the present invention is 1.5-fold higher than in a Sauvignon Blanc wine produced according to standard methods (i.e. without a bubbling of hydrogen sulfide).

In another experiment, the off-gas from a naturally hydrogen sulfide producing ferment was captured and bubbled through a non-inoculated Sauvignon Blanc grape juice kept between 4° C. and 10° C.

After 4 days the treated (bubbling) and non-treated (no bubbling) juices were inoculated with the commercial yeast strain Zymaflore X5 (Laffort) and fermented according to industry standards (i.e. 20 g of yeast per 100 L of juice).

Thiols (3MH and 3MHA) were later measured in the finished wines.

Figure 2:
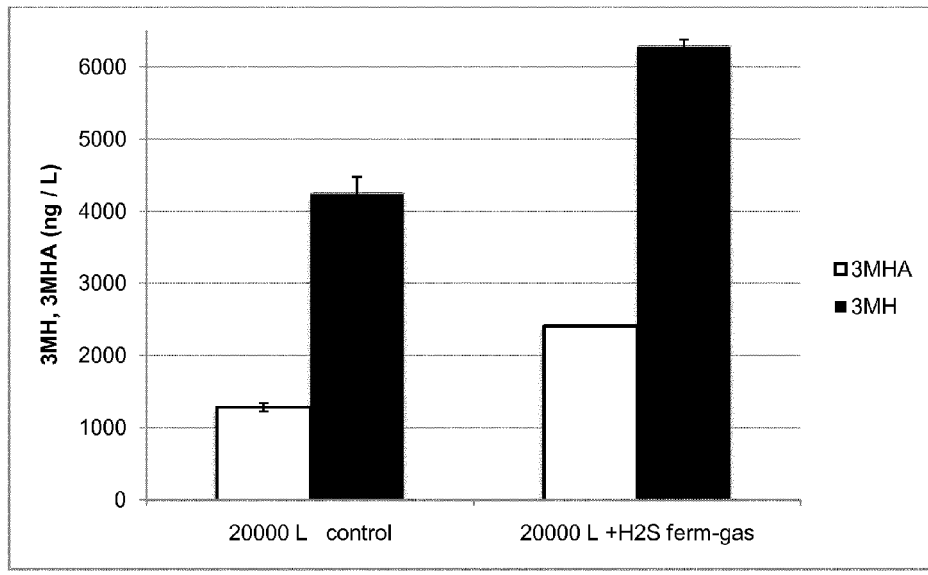
FIG. 2 is a diagram showing the influence of the bubbling of hydrogen sulfide into grape juice on the generation of the volatile thiols 3MH and 3MHA during the production of Sauvignon Blanc wine.

The diagram of the FIG. 2 shows:
  the level of 3MH and 3MHA in a 20 000 L tank in which no hydrogen sulfide was bubbled into (i.e. "control");
  the level of 3MH and 3MHA in a 20 000 L tank in which hydrogen sulfide was bubbled into (i.e. "+$H_2S$ ferm-gas");

FIG. 2 shows that 3MH increased by 48% and 3MHA increased by 88% in the hydrogen sulfide treated juice compared to the control tank.

The invention claimed is:

1. A method of producing an alcoholic beverage by fermentation comprising:
   providing grape juice in a tank;
   introducing a gas stream comprising about 6 ppm to about 13 ppm hydrogen sulfide into the grape juice to cause bubbling of the grape juice;
   inoculating the bubbling grape juice with yeast to initiate fermentation; and
   continuing the fermentation to obtain the alcoholic beverage.

2. The method of producing an alcoholic beverage according to claim 1, wherein the produced alcoholic beverage has higher levels of 3MH and 3MHA in comparison to an alcoholic beverage obtained without the bubbling of the grape juice with the gas stream.

3. The method of producing an alcoholic beverage according to claim 1, wherein the gas stream containing hydrogen sulfide which is bubbled into the grape juice is stopped midway through the fermentation.

4. The method of producing an alcoholic beverage according to claim 1, wherein the gas stream containing hydrogen sulfide is taken from an existing wine fermentation culture producing hydrogen sulfide naturally.

5. The method of producing an alcoholic beverage according to claim 1, wherein the introducing of the gas stream is carried out with sintered gas spargers.

6. The method of producing an alcoholic beverage according to claim 1, wherein the alcoholic beverage is selected from the group consisting of wines and spirits.

7. The method of producing an alcoholic beverage according to claim 1, wherein the alcoholic beverage is a Sauvignon Blanc wine.

8. The method of producing an alcoholic beverage according to claim 1, wherein the grape juice is obtained from grapes of the Sauvignon Blanc variety.

* * * * *